(12) United States Patent
Schneider

(10) Patent No.: US 7,108,764 B2
(45) Date of Patent: Sep. 19, 2006

(54) APPARATUS FOR CONTINUOUS JOINING AND/OR WELDING OF MATERIAL WEBS USING ULTRASOUND

(75) Inventor: Arnold Schneider, Ettlingen-Schluttenbach (DE)

(73) Assignee: Herrmann Ultraschalltechnik GmbH & Co. K.G., Karlsbad-Ittersbach (DE)

( * ) Notice: Subject to any disclaimer, the term of this patent is extended or adjusted under 35 U.S.C. 154(b) by 0 days.

(21) Appl. No.: 10/826,857

(22) Filed: Apr. 16, 2004

(65) Prior Publication Data

US 2005/0034820 A1    Feb. 17, 2005

(30) Foreign Application Priority Data

Aug. 13, 2003  (DE) ................... 103 37 740
Sep. 11, 2003  (DE) ................... 103 43 325

(51) Int. Cl.
*B32B 37/00*   (2006.01)

(52) U.S. Cl. .................... 156/580.2; 156/515

(58) Field of Classification Search ............... 156/73.1, 156/73.3, 510, 515, 555, 580.1, 580.2, 582; 228/110.1, 1.1; 425/174.2; 264/442, 443, 264/444
See application file for complete search history.

(56) References Cited

U.S. PATENT DOCUMENTS 5,552,013 A * 9/1996 Ehlert et al. ................. 156/555
5,645,681 A * 7/1997 Gopalakrishna et al. .. 156/580.2
5,707,483 A * 1/1998 Nayar et al. .............. 156/580.2
5,817,199 A * 10/1998 Brennecke et al. ........ 156/73.1
5,976,316 A * 11/1999 Mlinar et al. ............. 156/580.2
6,059,923 A * 5/2000 Gopalakrishna .......... 156/580.2
6,454,890 B1 * 9/2002 Couillard et al. .......... 156/73.1
6,547,903 B1 * 4/2003 McNichols et al. ........... 156/64
6,758,925 B1 * 7/2004 Stegelmann ................ 156/73.1
6,767,420 B1 * 7/2004 Stegelmann ................ 156/73.1
2003/0155403 A1 * 8/2003 Haregoppa et al. ...... 228/110.1

FOREIGN PATENT DOCUMENTS

| DE | 2944080 | 5/1980 |
| WO | WO 97/27005 | 7/1997 |
| WO | WO01/94099 | 12/2001 |

OTHER PUBLICATIONS

European Search Report dated Mar. 10, 2006.

* cited by examiner

*Primary Examiner*—James Sells
(74) *Attorney, Agent, or Firm*—Young & Basile, P.C.

(57) ABSTRACT

An apparatus for continuously bonding and/or welding material webs by means of ultrasound, having an ultrasonic horn configured as a rotating roller, an anvil radially opposite the rotating roller, an amplitude transformer set axially on the rotating roller, an ultrasonic converter attached to the amplitude transformer with an energy supply, where the length 1 of the rotating roller equals a $\lambda/2$ wave or a multiple thereof ($1 = x \cdot \lambda/2$).

19 Claims, 10 Drawing Sheets

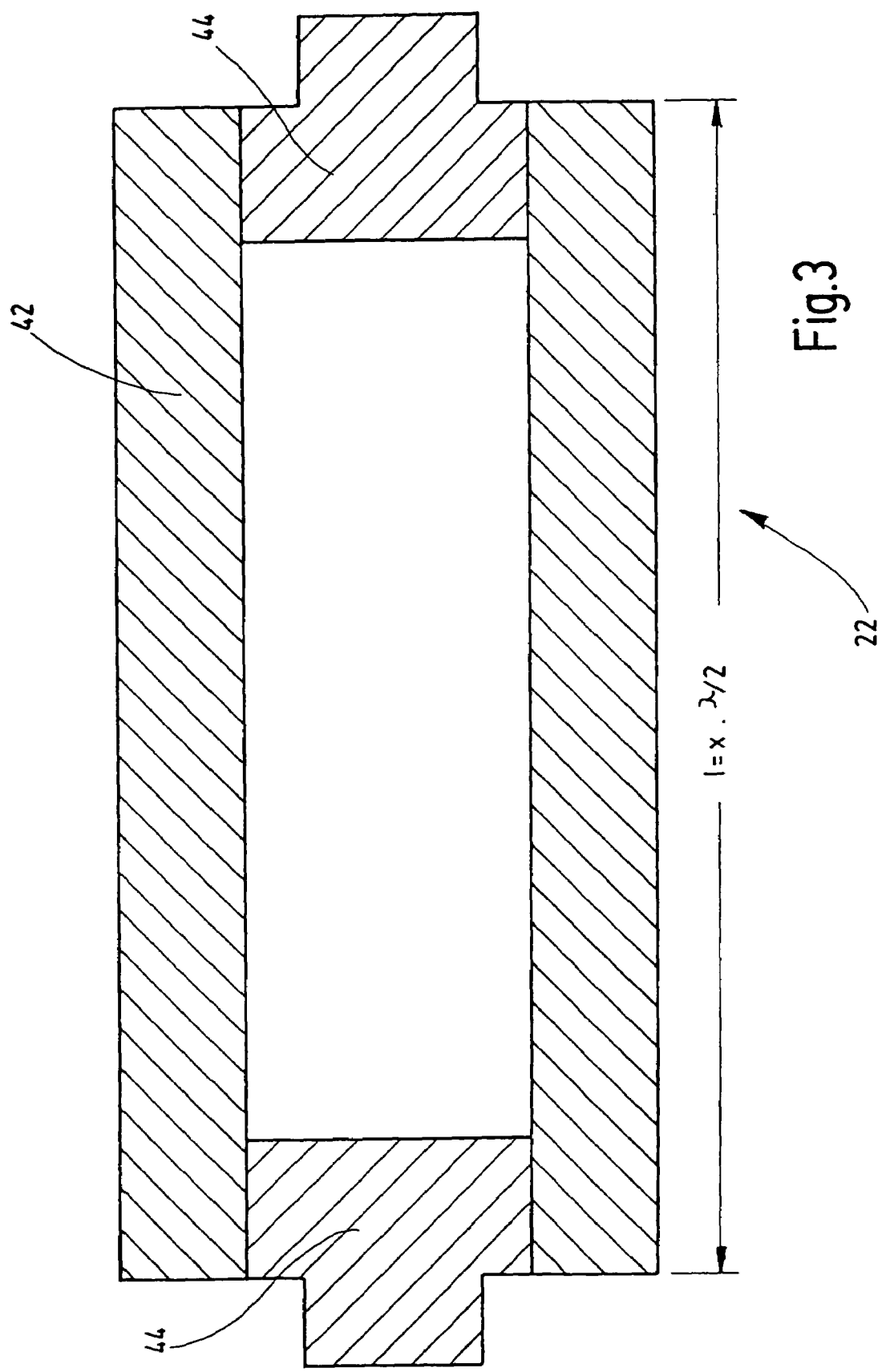

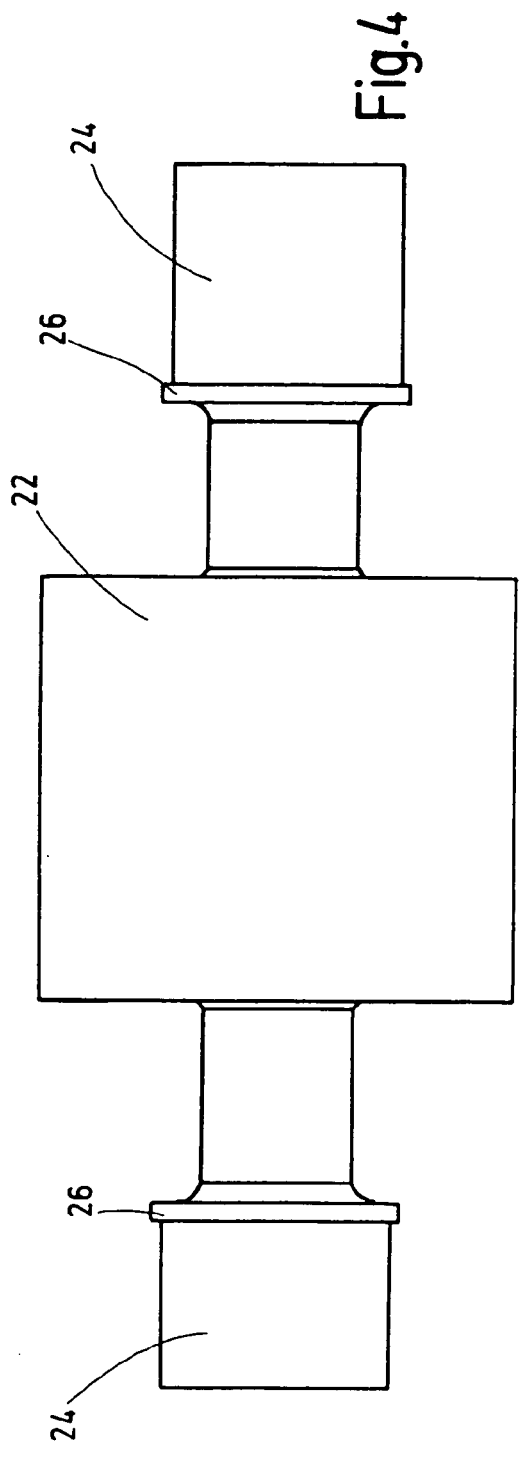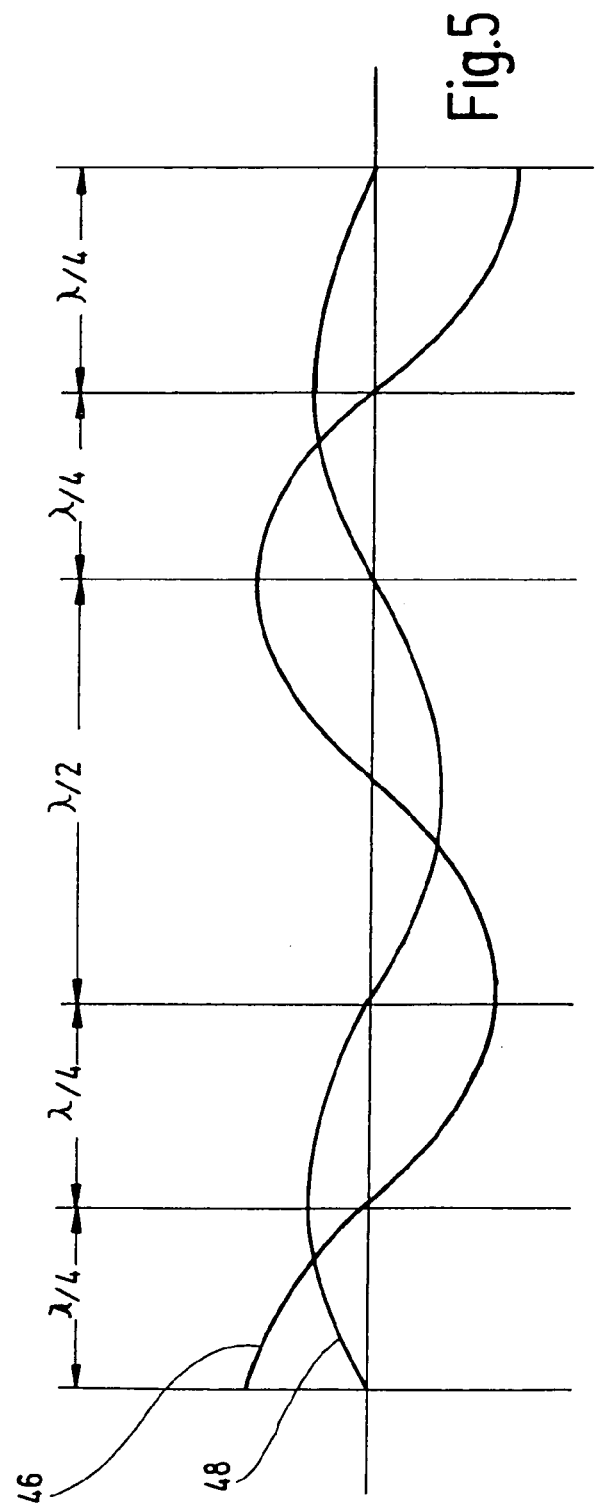

APPARATUS FOR CONTINUOUS JOINING AND/OR WELDING OF MATERIAL WEBS USING ULTRASOUND

BACKGROUND

The invention relates to an apparatus for the continuous bonding and/or welding of material webs using ultrasound, having an ultrasonic horn configured as a rotating roller, an anvil disposed radially opposite the rotating roller, an amplitude transformer set axially on the rotating roller, and an ultrasonic converter with an energy supply attached to the amplitude transformer.

It is known that for the continuous welding and/or bonding of material webs. The material webs are passed through a rotating roller and a fixed or similarly rotating roller and thereby processed. With fixed ultrasonic horns, large material widths can be covered, but a frictional force arises between the ultrasonic horn and the moving material web, negatively affecting the welding result. In addition, the frictional force causes heating of both the material webs and of the ultrasonic horn, thereby changing the pre-set gap.

The above described disadvantage of friction can be prevented with rotating ultrasonic horns, but only narrow-width welds can be performed. From U.S. published application 2002/030157, an ultrasonic horn is known with a width that is smaller than lambda-half. This also applies to the devices known from U.S. Pat. Nos. 5,707,483 and U.S. 6,547,903.

SUMMARY

The object of the invention is therefore to prepare an apparatus for the continuous bonding and/or welding of material webs, with which wide material webs can be processed.

This object is achieved with an ultrasonic horn configured as a rotating roller whose length is equal to a lambda-half wave of the imposed oscillation or a multiple thereof.

In the inventive apparatus, the ultrasonic horn configured as a rotating roller has a length which equals lambda-half or a multiple of lambda-half of the imposed oscillation. The length of the rotating roller essentially depends, therefore, on the material used and the desired operating frequency. By multiplying the length of the rotating roller to a multiple of lambda-half of the oscillation, extremely wide material webs can be processed without having to use several individual ultrasonic horns for this purpose. The material webs can also be dried with the inventive apparatus.

In a further development, radial bearings are furnished between the amplitude transformer and the rotating roller. These radial bearings are located particularly in a nodal point of the longitudinal oscillation, so that no or negligibly small oscillation amplitudes affect the bearings.

An amplitude transformer and an ultrasonic converter are preferably furnished on both sides of the rotating roller. Depending on the requisite energy with which the material webs are to be welded or bonded to each other, either one converter or two converters can be furnished, with the amplitude transformers located so that the converters can be changed, specifically bolted in. The converters can be of the same material as the rotating roller.

In one aspect, the two amplitude transformers and the roller are combined in a single component. Greater strength is achieved thereby, and there is no danger of the amplitude transformers becoming detached from the roller.

The anvil is preferably a rotating counter-roller. Two counter-rotating rollers offer the advantage that friction is limited to a minimum and that the material webs are handled very gently without the processing leading to format changes.

In one variation, the counter-roller is configured as an active roller and possesses two amplitude transformers and at least one converter. Each roller has its own converter.

The outer surface of either the rotating roller or the counter roller can be smooth or patterned. With a patterned roller, a texture can be embossed on the material webs, which results in an even tighter bond. The texture can be a nubby texture, a waffle texture, linear texture or a fantasy pattern.

In another aspect, the anvil is fixed and configured in particular as a knife, blade, or the like. The knife, blade or the like extends in a tangential direction, so that the welding or bonding of the material webs to each other takes place in linear fashion.

The gap width of the rotating roller and the anvil is adjustable in a known way. The setting can be regulated, so that the gap width is kept constant. This is of advantage, particularly with temperature changes, since the temperature changes do not then manifest themselves in a change in the gap width.

In a further development, the pressure exerted on the material web by the rotating roller can be adjusted. In particular, a pressure regulator can be furnished, so that consistent pressure is always imposed on the material webs.

In a preferred aspect, the rotating roller is formed by a hollow shaft with a trunnion at each end. A ultrasonic horn configured in this way is first of all light, secondly it possesses outstanding oscillation properties, since the antinode of the transverse oscillation at a length of lambda-half lies in the middle of the hollow shaft.

The rotating roller can advantageously be cooled or heated. Heat can thereby be drawn off or introduced selectively, keeping welding conditions constant.

In a preferred aspect, at least two rotating rollers lie against the anvil, arranged in tandem, where in particular the two rollers in tandem are offset to one another in the axial direction by an amount ($\Delta 1$). This provides a simple way of being able to increase the energy input and improve the distribution of energy. The amount is a lambda-quarter wave of the imposed oscillation ($\Delta 1 = \lambda/4$).

In accordance with the invention, the diameter (D) of the rotating roller is partially waisted where, in particular, the depth of the waist (E) equals one part of a lambda-half wave of the imposed oscillation ($E = |x| \cdot \lambda/2$). In its oscillating state, the rotating roller temporarily assumes the form of a cylinder, whereby better pressure distribution is achieved.

The rotating roller is advantageously made thicker in diameter such that contact pressure is evenly distributed along its length. This measure similarly contributes to an equalization of pressure distribution along the entire length of the roller, since the deformation of the roller by the contact pressure is compensated. This is specifically achieved by incorporating a bulge in the rotating roller. The change in diameter of the rotating roller corresponds exactly to the bending line.

A further measure to equalize the distribution of pressure is that the axis of the rotating roller and that of the counter-roller anvil are skewed to each other.

BRIEF DESCRIPTION OF THE DRAWING

Additional advantages, features and details of the invention can be found in the following description, in which particularly preferred embodiments are described in detail with reference to the drawing. The features depicted in the drawing and mentioned in the claims and the description can be essential to the invention individually or in any combination. In the drawing:

FIG. 3 shows a longitudinal section through the rotating roller;

FIG. 4 shows a side view of the ultrasonic horn with amplitude transformers;

FIG. 5 is a diagram showing the oscillations running in the transverse and longitudinal direction;

BRIEF DESCRIPTION

Figure 1:
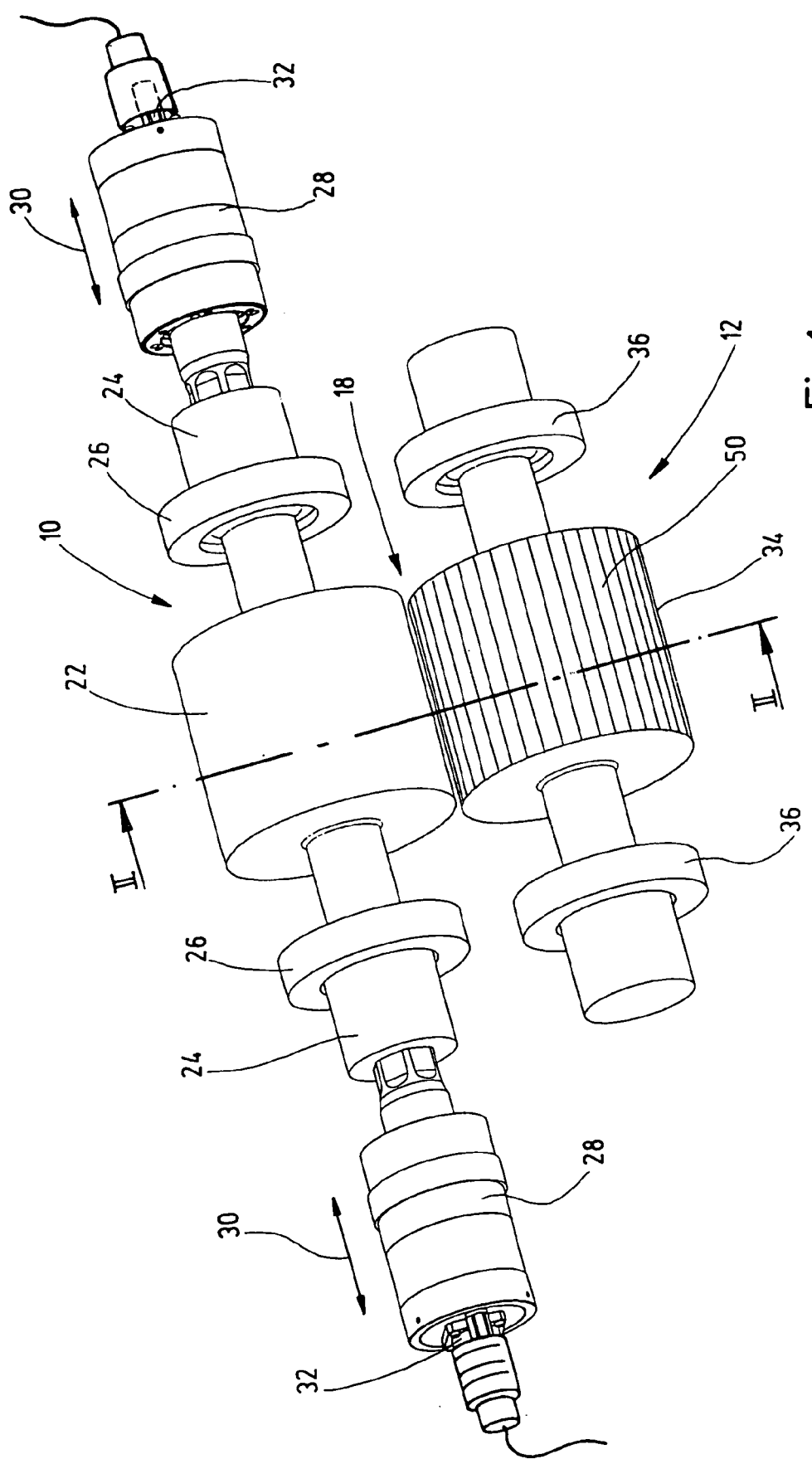
FIG. 1 shows a perspective view of a preferred aspect of the invention with an anvil configured as a counter-roller.

In FIG. 1, two rotating components can be seen, identified in general by reference numbers 10 and 12, between which two or more material webs 14 and 16 are being fed, wherein the two material webs 14 and 16 are bonded and/or welded together are they pass through a working gap 18. The pass-through direction is indicated by the arrow 20.

The component 10 possesses a central rotating roller 22, to which amplitude transformers 24 are attached on both sides, with radial bearings 26 furnished on said transformers. The amplitude transformers 24 are coupled to ultrasonic converters 28 through which a mechanical vibration can be generated in the longitudinal direction, i.e., in the direction of the double arrow 30. Rotary couplers 32 are furnished on the end faces of the ultrasonic converters 28 through which the ultrasonic converters 28 are provided with energy.

A counter-roller 34, which is similarly carried rotatably on radial bearings 36, is disposed opposite the rotating roller. The surface of the counter-roller 34 has ribs 50 running in the longitudinal direction which impart a texture to the counter-roller which is transferred to the material webs 14 and 16 when they are bonded.

Figure 2:
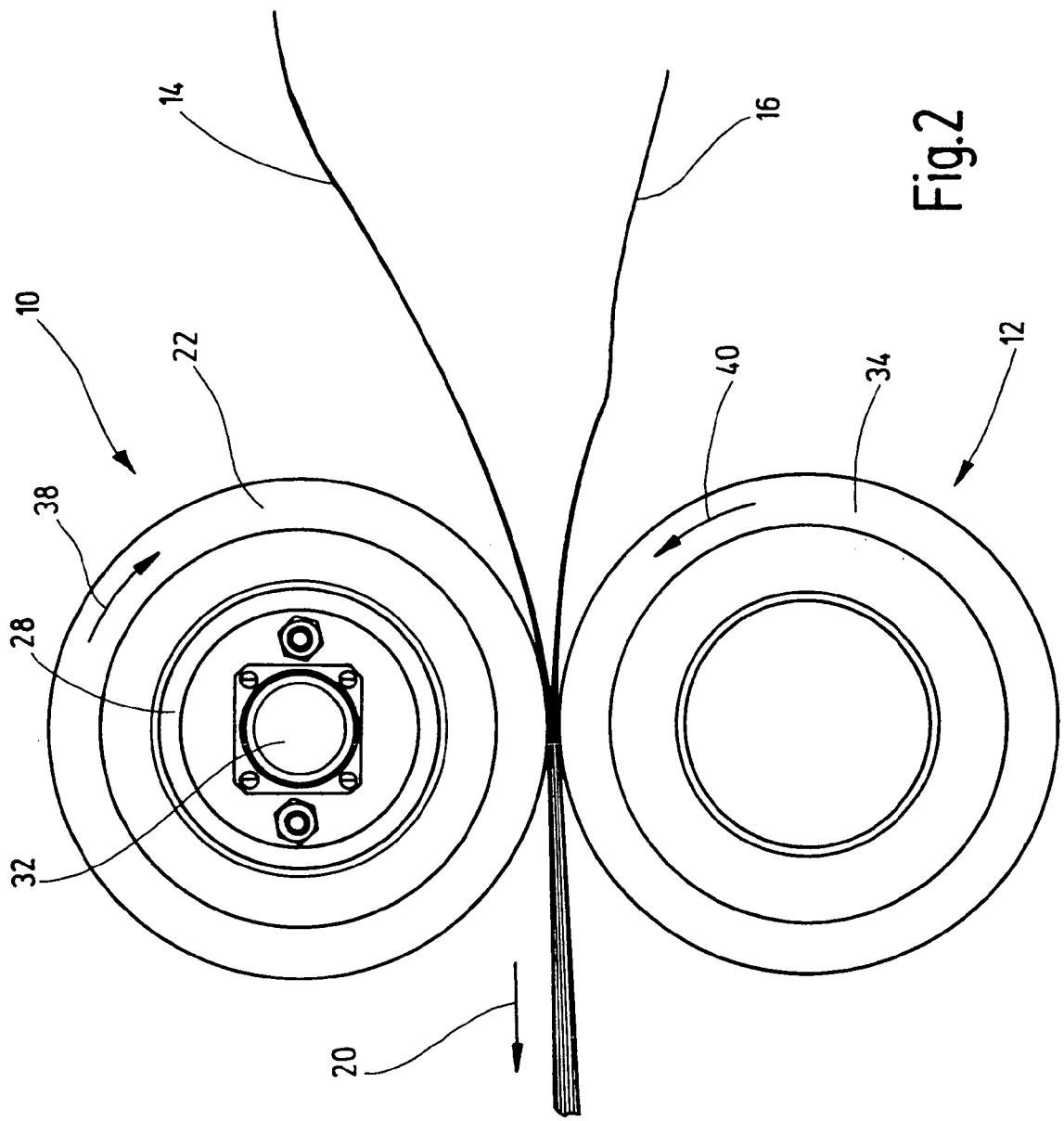
FIG. 2 shows a section along line II—II in FIG. 1.

In FIG. 2, the arrows 38 and 40 indicate the rotational directions of the rotating roller 22 and the counter-roller 34. The rotary coupler 32 can also be seen, through which the ultrasonic converter 28 is supplied with energy.

FIG. 3 shows a longitudinal section through the rotating roller 22, which in the aspect shown is formed by a hollow shaft 42 which is closed by trunnions 44. The amplitude transformers 24 (not shown in FIG. 3) are attached to these trunnions 44.

FIG. 4 shows a side view of the rotating roller 22 with the laterally attached amplitude transformers 24 and the radial bearing 26. In the aspect shown, the length 1 of the rotating roller 22 equals lambda-half ($\lambda/2$) of the oscillation imposed by the amplitude transformers 24. The two radial bearings 26 are spaced lambda-quarter ($\lambda/4$) from the end faces of the rotating roller 22 and the two amplitude transformers 24 extend by lambda-quarter ($\lambda/4$) beyond the radial bearings 26.

The diagram shown in FIG. 5 shows the longitudinal oscillation, reference numeral 46, which is generated by the amplitude transformers 24. The transverse oscillation runs offset to it by lambda-quarter ($\lambda/4$), causing an oscillation of the rotating roller in the radial direction by which the welding process is carried out.

In the aspect in FIG. 4, the length 1 of the rotating roller is lambda-half ($\lambda/2$), although the length can also be a multiple thereof, as indicated in FIG. 3. In this way it is possible to bond material webs 14 and 16 whose width is greater than lamda-half.

Figure 6:
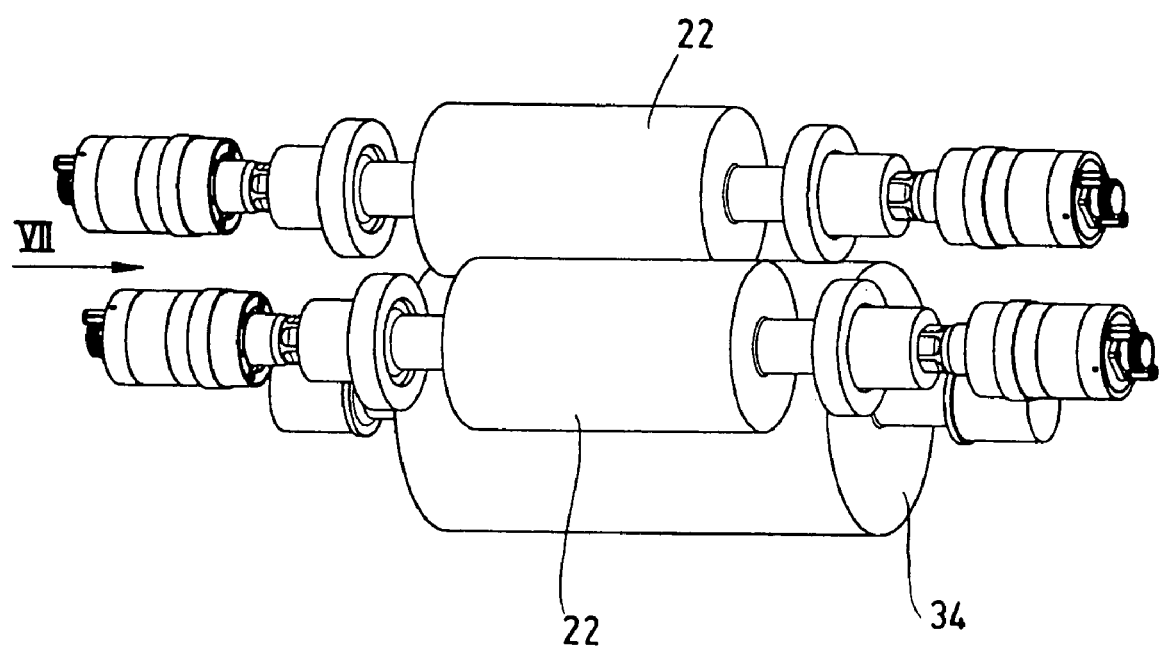
FIG. 6 shows a perspective view of an aspect with two rotating rollers.
Figure 7:
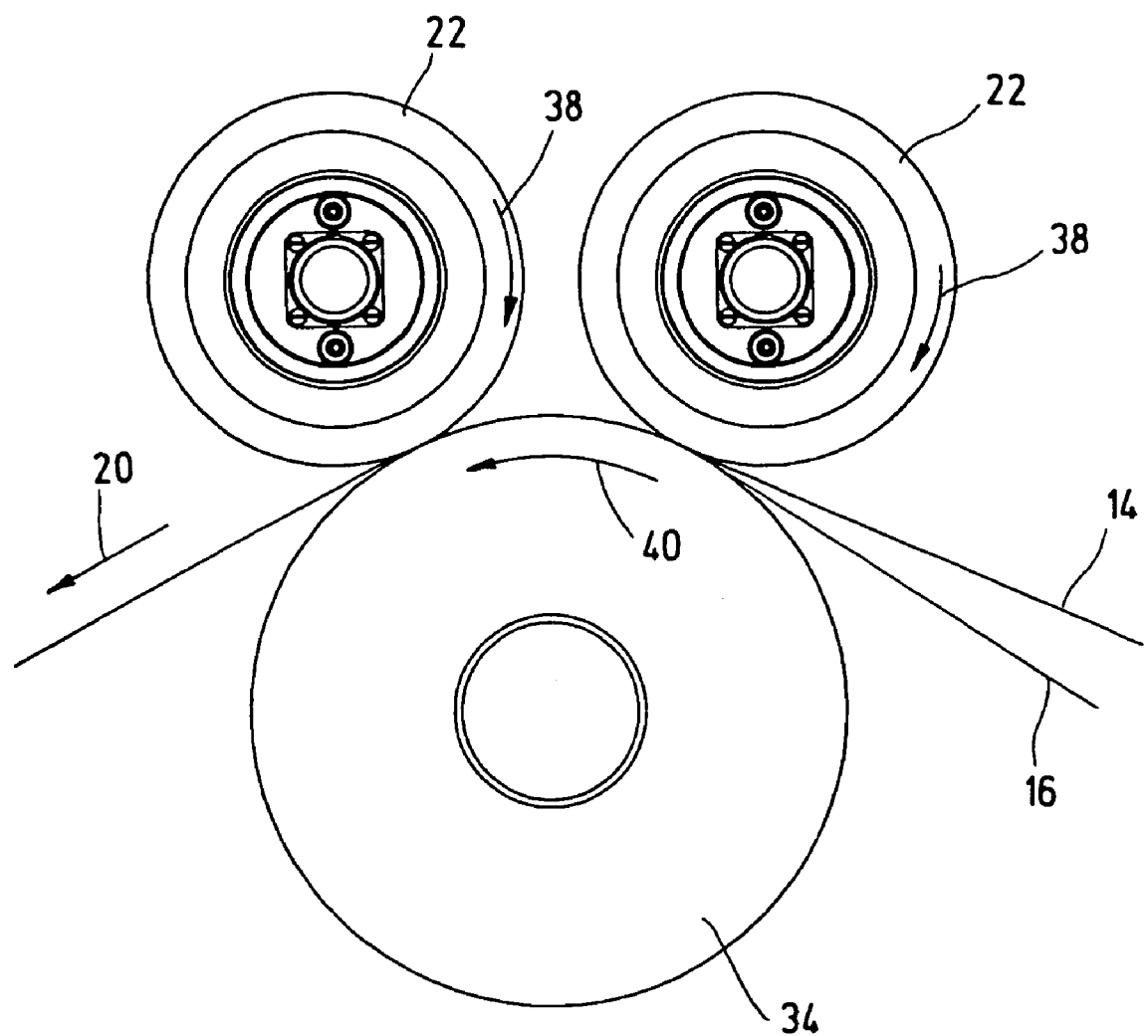
FIG. 7 shows a side view in the direction of arrow VII in FIG. 6.
Figure 8:
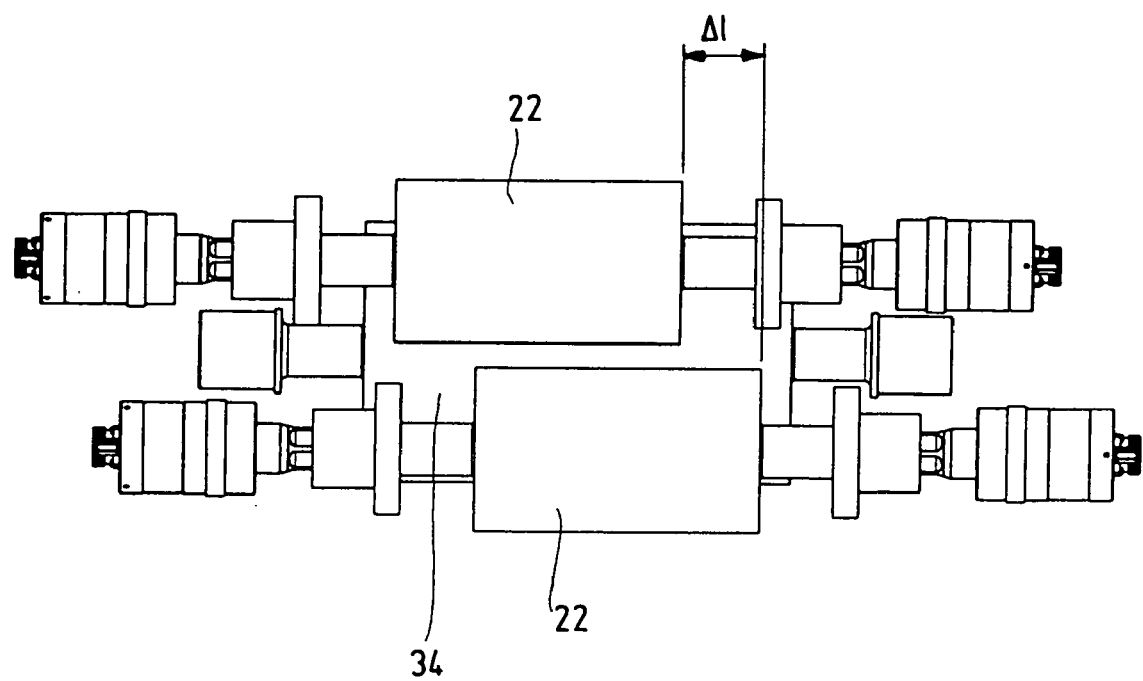
FIG. 8 shows an aspect with two rotating rollers offset to each other.

In FIGS. 6 through 8, two rotating rollers 22 are arranged around the counter-roller 34, with the rotating rollers 22 disposed behind one another and offset by an angle of 50° to 60° and additionally offset to each other in the axial direction by an amount of $\Delta 1 = \lambda/4$, which is shown clearly in FIG. 8. The two rotating rollers 22 can be configured identically and are driven by the same frequency generator or oscillate in the same direction.

Figure 9:
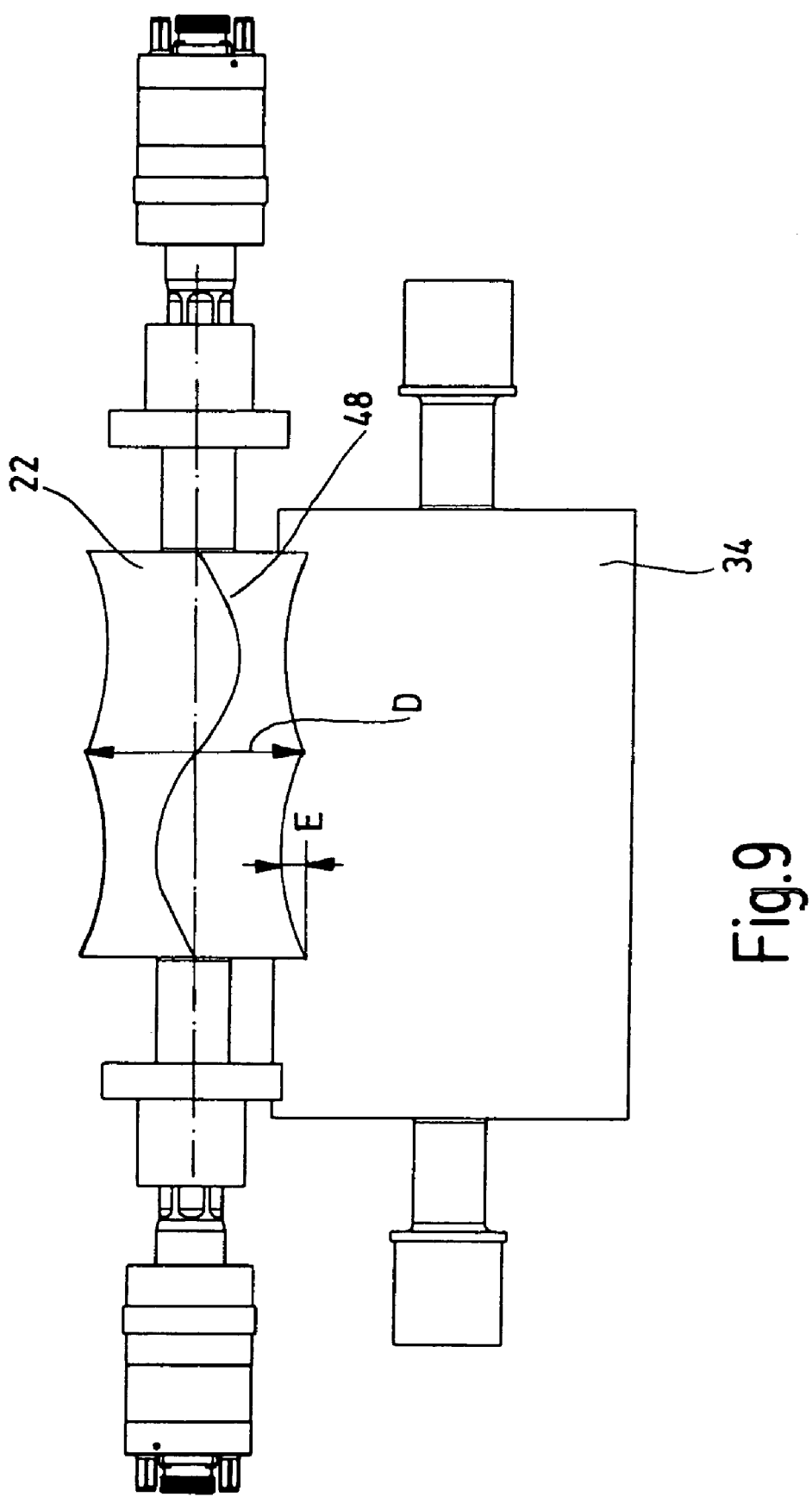
FIG. 9 shows a side view of an aspect with a rotating roller having waists.

FIG. 9 shows an aspect in which the rotating roller 22 has a waist E whereby the diameter D is selectively reduced over the length of the roller 22. The transverse oscillation 48 of the roller 22 is also shown diagrammatically in FIG. 9. It can be seen that the waist E is always deepest where an oscillation antinode is located. The amount of the waist E is thus the product of a constant and lambda-half ($E = |x| \cdot \lambda/2$). When the rotating roller 22 is set oscillating, it temporarily assumes the form of a cylinder.

Figure 10:
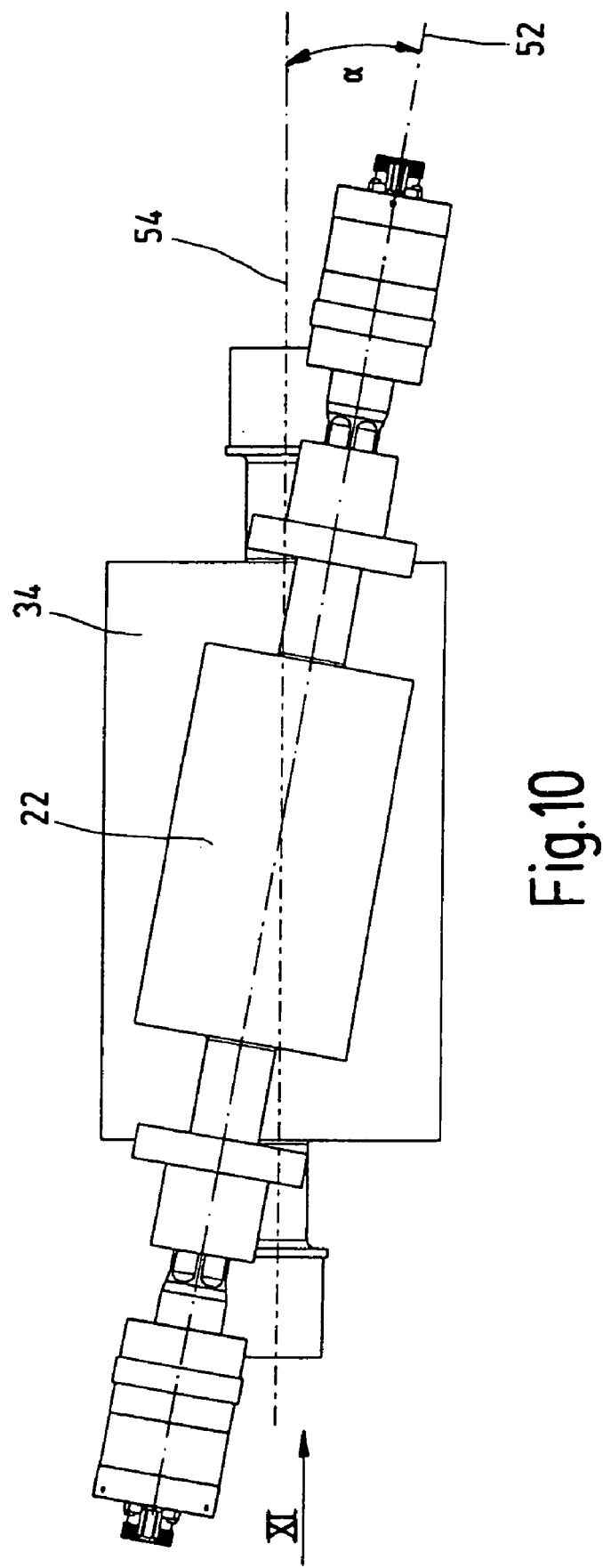
FIG. 10 shows a plan view of an aspect in which the axes of the rotating roller and the counter-roller are skewed relative to each other.
Figure 11:
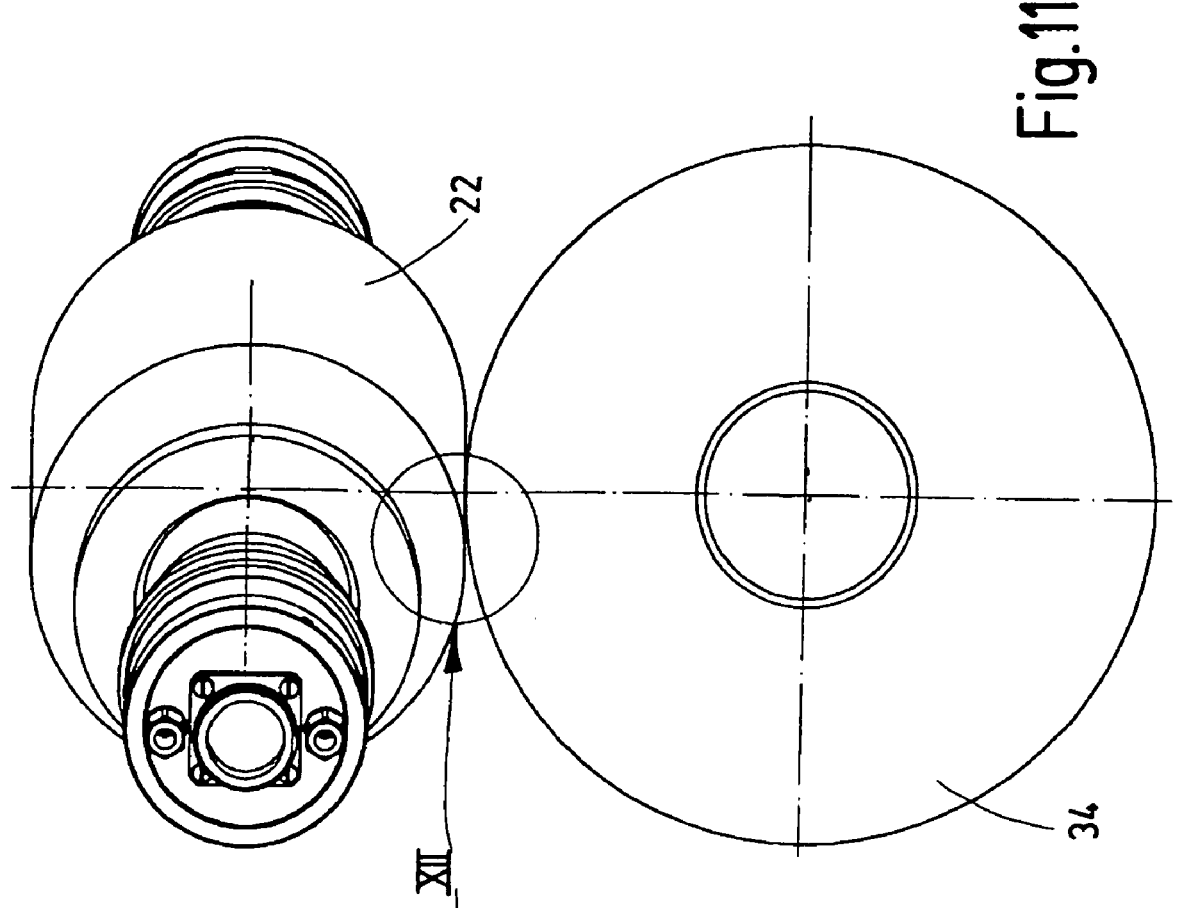
FIG. 11 is a side view in the direction of arrow XI in FIG. 10.
Figure 12:
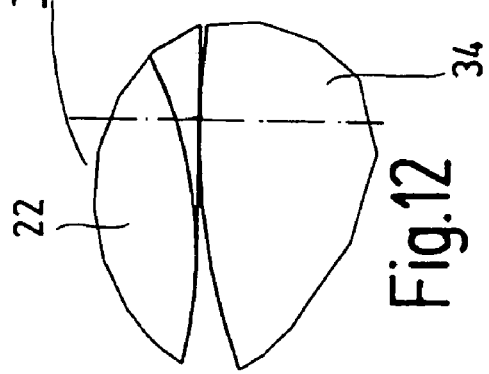
FIG. 12 shows an enlarged reproduction of the section XII in accordance with FIG. 11.

FIGS. 10 through 12 show a variation in which the one of the two rotating rollers 22 is set at an angle, so that its longitudinal axis 52 is skewed to the longitudinal axis 54 of the counter-roller 34. The skew angle is identified in FIG. 10 by $\alpha$. The section identified in FIG. 11 by XII is shown enlarged in FIG. 12, and it is clearly recognizable that the contact line of the two rollers does not run parallel to their axes but obliquely. The contact pressure can thereby be equalized.

What is claimed is:

1. An apparatus for the continuous bonding and/or welding of material webs by means of ultrasound comprising:
   an ultrasonic horn configured as at least two rotating rollers, arranged in tandem and offset to each other in the axial direction by an amount equal to a lambda-quarter wave of an imposed oscillation;
   an anvil disposed opposite the rotating rollers, each rotating roller in contact with the anvil;
   an amplitude transformer set axially on each end of the rotating rollers;
   at least one ultrasonic converter attached to each amplitude transformer with, an energy supply; and
   the length of the rotating rollers equaling a multiple of a lambda-half wave of an imposed oscillation on the rotating rollers.

2. The apparatus in accordance with claim 1, wherein radial bearings are disposed between the amplitude transformer and each rotating roller.

3. The apparatus in accordance with claim 1, wherein the anvil is a rotating counter-roller.

4. The apparatus in accordance with claim 1, wherein the outer surface of one of the rotating roller and the counter-roller is one of smooth and patterned.

5. The apparatus in accordance with claim 1, wherein the anvil is fixed.

6. The apparatus in accordance with claim 5, wherein the anvil extends in a tangential direction respective to the at least two rotating rollers.

7. The apparatus in accordance with claim 1, wherein the depth of the working gap between the at least two rotating rollers and the anvil is adjustable.

8. The apparatus in accordance with claim 1, wherein the pressure exerted by the at least two rotating rollers on the material web is adjustable.

9. The apparatus in accordance with claim 1, wherein each of the at least two rotating rollers is formed by a hollow shaft with trunnions.

10. The apparatus in accordance with claim 1, wherein the at least two rotating rollers can be one of cooled and heated.

11. The apparatus in accordance with claim 3, wherein the counter-roller is configured as an active roller with an amplitude transformer and an ultrasonic converter attached thereto.

12. The apparatus in accordance with claim 1, wherein the diameter of at least one rotating roller is partially waisted.

13. The apparatus in accordance with claim 12, wherein the depth of the waist equals one part of a lambda-half wave of the imposed oscillation.

14. The apparatus in accordance with claim 1, wherein a diameter of at least one rotating roller is made thicker such that pressure is equally distributed along its length.

15. The apparatus in accordance with claim 1, wherein at least one rotating roller has a swelling.

16. The apparatus in accordance with claim 1, wherein a change in diameter of at least one rotating roller corresponds to a bending line.

17. The apparatus in accordance with claim 3, wherein axes of at least one rotating roller and the counter-roller anvil are skewed relative to each other.

18. The apparatus in accordance with claim 1, wherein the anvil is one of a knife and a blade.

19. An apparatus forte continuous bonding and/or welding of material webs by means of ultrasound comprising:

an ultrasonic horn configured as at least two rotating rollers, arranged in tandem and offset each other in the axial direction by amounts equal to a lambda-quarter wave of an imposed oscillation, and the length of each rotating roller equaling a multiple of a Lambda-half wave of the imposed oscillation of each rotating roller;

a fixed anvil configured as a rotating counter-roller disposed opposite the rotating rollers, each rotating roller in contact with the anvil, the anvil extending in a tangential direction respective to each rotating roller;

an adjustable working gap between each rotating roller and the anvil;

an amplitude transformer set axially on each end of each rotating roller;

at least one ultrasonic converter attached to each amplitude transformer with an energy supply; and radial bearings disposed between the amplitude transformer and the rotating roller.

* * * * *